C. A. THOMPSON.
NUT LOCK.
APPLICATION FILED MAR. 9, 1911.
1,020,668.
Patented Mar. 19, 1912.
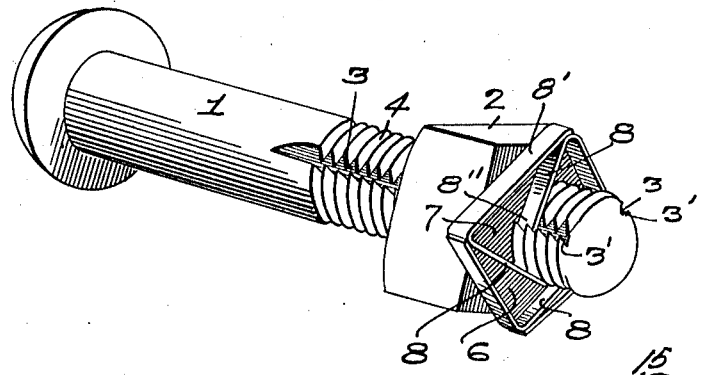
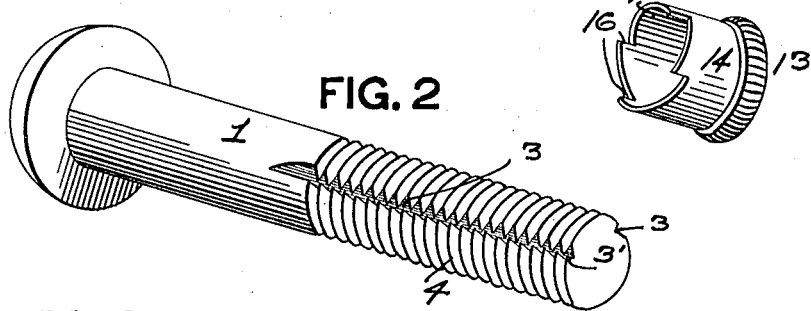
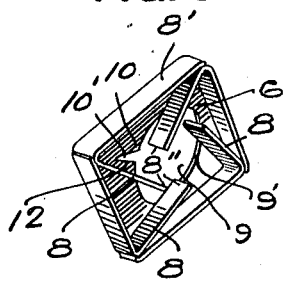
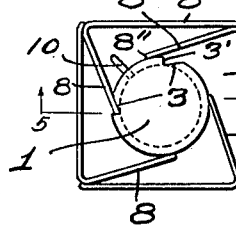
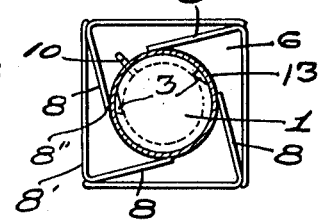
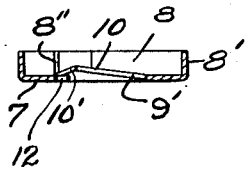
WITNESSES.
J. R. Keller
Robert C. Totten
INVENTOR.
Charles A. Thompson
By Kay & Totten
Attorneys

UNITED STATES PATENT OFFICE.

CHARLES A. THOMPSON, OF IRWIN, PENNSYLVANIA.

NUT-LOCK.

1,020,668.  Specification of Letters Patent.  Patented Mar. 19, 1912.

Application filed March 9, 1911. Serial No. 613,330.

*To all whom it may concern:*

Be it known that I, CHARLES A. THOMPSON, a citizen of the United States, and resident of Irwin, in the county of Westmoreland and State of Pennsylvania, have invented a new and useful Improvement in Nut-Locks; and I do hereby declare the following to be a full, clear, and exact description thereof.

My invention relates to nut locks, and particularly to that class of nut locking or securing devices in which a nut of ordinary construction is secured upon a bolt by a separate member or locking nut. Its object is to provide an improved device of this character which can be applied to any standard bolt and nut without in any manner requiring a special construction or alteration of the nut and by simply cutting a groove or slot longitudinally in the threaded portion of the bolt; and to further provide a locking nut which, while light and inexpensive in construction, still securely fastens the nut in any position on the bolt and prevents its coming loose through any amount of jarring or the like.

My prior United States Patent No. 439,754, dated Nov. 4, 1890, shows and describes a nut lock having some of the characteristics of my present invention, which in some aspects is intended as an improvement thereon, although it embodies a number of features which I regard as radically new. The nut lock described in said Patent No. 439,754 consists in a pressed metal strap or case encircling a nut of special form constructed to receive and hold the same, the said case being provided with a series of spring lips adapted to engage with a slot in the bolt to which the nut was applied. This construction necessitated the manufacture of a case or strap of complicated form, as well as the alteration of the nut by cutting a slot therein to receive a projection of the case; and it was found impractical on account of the difficulty of its application and the expense connected with its manufacture.

By my present invention I provide a locking member which is entirely separate and separately movable from the nut of ordinary standard or any desired construction with which it is used, and which can be manufactured cheaply of light metal and still have a holding or binding effect quite sufficient to prevent the turning loose or joggling of the nut due to sudden jars or contraction or expansion in variable temperatures. In these devices the thrust must be carried in any event by the nut itself, and by my invention the locking nut employed, which is of spring metal, exerts a continued pressure against the nut so that it cannot work loose, the locking nut itself being securely held in position on the bolt.

My invention consists, generally stated, in the combination with a bolt having a longitudinal groove therein and a nut of ordinary or any desired form threaded on the bolt, of a nut lock or locking member, preferably constructed entirely of spring pressed metal, having means such as an off-set or pressed fin for engaging the thread of the bolt, and having one or preferably a plurality or series of spring arms adapted to gear on the bolt in forward turning and to engage with or lock within the groove when the locking member is turned against the nut.

It also consists in the certain other characteristic features of construction described more fully below, and included in the accompanying claims.

In the accompanying drawings Figure 1 is a perspective view illustrating one form of my invention. Fig. 2 is a like view of a bolt illustrating the groove therein employed. Fig. 3 is a detail perspective view of the nut lock illustrated in Fig. 1. Fig. 4 is an end view illustrating the same applied to a bolt as in Fig. 1. Fig. 5 is a cross section through the nut lock on the line 5—5 Fig. 4. Fig. 6 is a perspective view of a tool or thimble conveniently employed in removing the nut lock and Fig. 7 is an end view partly in cross section illustrating the same as applied to the nut lock on a bolt.

The bolt 1 illustrated is provided with the nut 2 of ordinary construction. The grooves 3 are cut longitudinally of the bolt through the threaded portion 4, one or any desired number of such grooves being employed, two being illustrated in the drawings. The groove 3 can be readily cut in any ordinary bolt, either when new or after being in use by a simple tool, as will be well understood to persons skilled in the art.

The nut lock or member 6 is constructed preferably of pressed sheet metal throughout, and comprises essentially the body portion 7 and spring arms 8. It is obvious, however, that other forms of construction may be practiced, such as constructing the body portion 7 of heavier metal and otherwise providing the spring arm thereon. The body portion 7 of the nut lock 6 has necessarily a central hole or opening 9 to admit the bolt 1. In the embodiment illustrated the body portion 7 is provided with the thread engaging off-set 10, which is conveniently constructed by pressing a tongue from the sheet metal of said body portion 7 which is transversely slotted at 10', as indicated clearly in Figs. 3 and 5. The arm or tongue 10 is preferably carried completely around the slot opening 9 so that the marginal wall 9' of said hole forms a complete helical thread extending from the arm or off-set 10 on one side of the transverse slot 10' to the oppositely disposed off-set 12 on the other side of said slot 10'. The slot 10' therefore separates the opposite ends of a helical thread extending nearly one complete circumference and the opposite ends 10 and 12 of which are separated by nearly the pitch of the ordinary or standard thread which is used on a bolt of the diameter to which the particular locking member is applied.

The spring lips or arms 8 are preferably arranged in series around the bolt 1, four of such arms being illustrated as a convenient number to be pressed from an integral sheet or blank of thin metal in the construction of the nut lock 6, and quite sufficient for engagement by one of said arms with a groove 3 in any position of the nut lock 6 where one or at the most two of such grooves are employed. Each spring arm 8 is preferably pressed from one of the integral side walls or faces 8', which upset from the sheet metal body portion 7 so as to form polygonal wrench faces, which mutually brace one another.

Assuming that the nut 2 has been turned to engaging position with the work and that it is desired to apply the nut lock or locking member 6 thereto, the said nut lock 6 may be threaded onto the bolt 1 in the manner of an ordinary nut, the backwardly inclined spring arms 8 sliding around the bolt 1, until the locking member engages the nut 2. A further slight turn of the nut lock 6, or if necessary a further slight tightening of the nut 2, will always suffice to bring one of the spring arms 8 into engagement with one of the grooves 3. In the forward turning or movement of the locking member 6 the said spring arms are carried over and across each slot 3, which has preferably an abutting side 3' substantially radial to the axis of the bolt 3, but not engaged by the end 8' of any of the arms 8 during the forward movement of the locking nut 6. A slight further tightening if necessary, of the locking member 6 after it is brought adjacent to the nut 2 always suffices to bring one of the spring arms 8 into register with one of the grooves 3, however, so that it is locked therein against backward movement, and the locking member is fastened in pressing or bearing position against the nut 2.

The resiliency of the pressed metal body portion 7 of the locking member 8 and of the spring arms 8 provides for the fastening of the locking member in any position of the nut 2 on the bolt 3. Where four of such spring arms 8 are employed, it is clear that, with one groove 3 only, one of said spring arms will register with said groove exactly without any compression or yielding of the spring arms or locking member proper at intervals one-fourth of the pitch of the thread 4 apart. This has been found quite sufficient in practice to enable locking at all positions, although if desired one or more additional grooves 3 may be employed at proper positions about the bolt 2, as indicated by Figs. 1, 4 and 7. Each additional groove employed obviously reduces the exact registering locking interval without yielding of the spring parts by one-half.

The locking member 6 cannot be loosened on the bolt 1 without destroying or at least completely deforming the particular spring arm 8 in engagement with a slot 3. Where it is desired to remove the locking member for any reason, it is necessary to force outwardly the spring arm 8 in engagement; and for this purpose I have provided the interlocking thimble 13 of sleeve form which can be constructed in suitable sizes to pass over any bolt 1 of standard size. It has preferably an annular middle portion 14 to be engaged by the fingers and a sleeve portion 15 provided with the teeth 16 preferably corresponding in number to the arms 8 of the nut lock and adapted to enter between said arms and the bolt 1 and pry open the particular arm in engagement with the slot 3. The nut lock 6 is then conveniently threaded backwardly on the bolt 1 until it is removed therefrom. In this manner a rusted or defective nut can be replaced by a new one without necessitating the use of a new locking member. As the locking member 6 can be conveniently and cheaply galvanized, plated, or otherwise rendered rust-proof, the economy of its use is thereby greatly increased.

What I claim is:

1. In nut locks, the combination with a bolt having a thread, a longitudinal slot therein and a nut thereon, of a separately movable locking member comprising a body portion having a circular hole and provided with a helical marginal wall around said hole forming a complete thread of nearly one circumference interthreading with said bolt thread, and a spring arm bearing on the bolt thread and adapted to interlock with said groove to prevent backward movement of the locking nut.

2. In nut locks, the combination with a bolt having a thread, a longitudinal groove therein, and a nut thereon, of a separately movable locking member comprising a body portion having a hole to receive the bolt and having its margin around said hole adapted to interthreadably engage with said bolt thread, and an integral spring arm bearing on the bolt thread and extending normally at a backward incline to within the margin of said hole, and adapted to interengage with said groove and prevent retrogressive movement of the locking member.

3. In nut locks, the combination with a bolt having a thread, a groove therein and a nut thereon, of a locking member comprising a body portion of thin pressed metal provided with a bolt receiving hole, and having a helical marginal wall around the same forming a thread interthreading with said bolt thread, and a spring arm integral with said body portion and extending normally at a backward incline to bear on the bolt thread when the locking member is turned forwardly and to engage with said groove to prevent retrogressive movement of the locking member.

4. In locking nuts, the combination with a bolt having a thread and a longitudinally extending groove, of a locking member of thin pressed metal comprising a body portion provided with a hole to receive the bolt and a slot extending transversely therefrom and having its marginal wall around said bolt receiving hole pressed to form a thread terminating at said transverse slot, and a plurality of spring arms integral with said body portion and extending normally at a backward incline to within the margin of said hole and adapted thereby to interengage with said groove and prevent retrogressive movement of the locking member.

5. In nut locks, the combination with a bolt having a longitudinal groove and a nut on said bolt, of a separately movable locking member comprising a resilient body portion having an opening to receive the bolt and a helical marginal wall about the same forming a thread interthreading with the bolt thread, and a plurality of inwardly extending and backwardly inclined spring arms bearing on said bolt and adapted to interlock with said groove, substantially as described.

6. In nut locks, the combination with a bolt having a groove and a nut, of a locking member comprising a pressed metal body portion adapted to interthreadably engage said bolt and having a plurality of integral side walls each laterally pressed from said body portion to form polygonal faces adapted to be engaged by a wrench, and each provided with an integral inwardly extending spring arm adapted to engage said groove, substantially as described.

7. A nut lock comprising a thin body portion of pressed metal provided with a bolt receiving hole having its edge pressed to thread form to engage the bolt thread, and a spring arm integral with said body portion and extending at a backward incline to the margin of said hole and adapted to engage with the bolt.

8. A nut lock comprising a body portion of thin pressed metal provided with a bolt receiving hole having its edge pressed to thread form to engage with the bolt thread and a plurality of spring arms integral with said body portion and extending at backward inclines to the margin of the hole and adapted to engage with the bolt.

9. A nut lock comprising a body portion of thin pressed metal provided with a bolt receiving hole having its edge pressed to thread form to engage with the bolt thread and its outer edges bent up at right angles with the body portion to form wrench receiving faces and having integral spring arms extending from such bent up edge portions at a backward incline to the margin of said hole and adapted to engage with the bolt.

In testimony whereof, I the said CHARLES A. THOMPSON have hereunto set my hand.

CHARLES A. THOMPSON.

Witnesses:
ROBERT C. TOTTEN,
JOHN F. WILL.